(12) United States Patent
Seifert et al.

(10) Patent No.: US 11,434,945 B2
(45) Date of Patent: Sep. 6, 2022

(54) DEVICE AND METHOD FOR CREATING A DISTRIBUTION OF UNSTEADY SUCTION

(71) Applicant: RAMOT at Tel Aviv University Ltd., Tel Aviv (IL)

(72) Inventors: Avraham Seifert, Tel Aviv (IL); Nimrod Shay, Tel Aviv (IL); Ariel Yaniv, Tel Aviv (IL); Ofek Drori, Tel Aviv (IL)

(73) Assignee: Ramot at Tel Aviv University Ltd., Tel Aviv (IL)

( * ) Notice: Subject to any disclaimer, the term of this patent is extended or adjusted under 35 U.S.C. 154(b) by 448 days.

(21) Appl. No.: 16/454,077

(22) Filed: Jun. 27, 2019

(65) Prior Publication Data

US 2020/0158147 A1 May 21, 2020

Related U.S. Application Data

(60) Provisional application No. 62/767,537, filed on Nov. 15, 2018.

(51) Int. Cl.
| | |
|---|---|
| *F15C 1/22* | (2006.01) |
| *F15D 1/06* | (2006.01) |
| *F15D 1/12* | (2006.01) |
| *F15C 1/18* | (2006.01) |
| *F15D 1/00* | (2006.01) |
| *F15C 1/08* | (2006.01) |

(52) U.S. Cl.
CPC .................. *F15C 1/22* (2013.01); *F15D 1/06* (2013.01); *F15C 1/08* (2013.01); *F15C 1/18* (2013.01); *F15D 1/008* (2013.01); *F15D 1/12* (2013.01)

(58) Field of Classification Search
CPC ...... F15C 1/22; F15C 1/08; F15C 1/18; F15D 1/06; F15D 1/008; F15D 1/12
USPC ........ 137/835, 833, 841; 244/205, 201, 203, 244/204, 199.1, 200.1
See application file for complete search history.

(56) References Cited

U.S. PATENT DOCUMENTS

| | | | | |
|---|---|---|---|---|
| 3,001,698 | A * | 9/1961 | Warren ..................... | F15C 1/22 235/201 PF |
| 3,159,168 | A * | 12/1964 | Reader ..................... | G04F 5/12 137/835 |
| 3,779,199 | A * | 12/1973 | Mayer, Jr. ............... | B64C 21/04 440/38 |
| 5,639,022 | A * | 6/1997 | Yanta ....................... | B05B 1/08 239/101 |
| 7,510,149 | B2 * | 3/2009 | Miller ..................... | B64C 21/02 244/207 |
| 7,686,257 | B2 * | 3/2010 | Saddoughi ............... | F15D 1/12 244/204 |
| 8,382,043 | B1 * | 2/2013 | Raghu ..................... | B64C 21/04 244/207 |
| 11,155,342 | B2 * | 10/2021 | Buscher ................ | B64C 21/025 |

(Continued)

*Primary Examiner* — Minh Q Le
(74) *Attorney, Agent, or Firm* — Browdy and Neimark, P.L.L.C.

(57) ABSTRACT

A method and device for creating a distribution of unsteady suction, the device may include ejectors; and a fluidic oscillator; wherein the fluidic oscillator may be configured to switch a first flow of fluid, in a cyclic manner, between the ejectors; wherein the ejectors may be fluidly coupled to the fluidic oscillator; and wherein each one of the ejectors may be configured to create pulsed suction through at least one first aperture, and (b) pulsed ejection through at least one second aperture.

20 Claims, 11 Drawing Sheets

(56) References Cited

U.S. PATENT DOCUMENTS

| | | | | |
|---|---|---|---|---|
| 2006/0048829 A1* | 3/2006 | Seifert | ............... | F15C 1/10 |
| | | | | 137/834 |
| 2009/0308980 A1* | 12/2009 | Miller | ............... | B64C 21/04 |
| | | | | 244/207 |
| 2013/0277502 A1* | 10/2013 | Bauer | ............... | F15D 1/12 |
| | | | | 244/208 |
| 2013/0291981 A1* | 11/2013 | Lengers | ............ | F15B 21/12 |
| | | | | 137/825 |
| 2019/0136881 A1* | 5/2019 | Amitay | ............ | B64C 21/04 |
| 2021/0223758 A1* | 7/2021 | Rafferty | ......... | F16K 99/0034 |

* cited by examiner

140

142

144

146

✳ SUCTION

DEVICE AND METHOD FOR CREATING A DISTRIBUTION OF UNSTEADY SUCTION

CROSS REFERENCE

This application claims priority from U.S. provisional patent 62/767,537 filing date Nov. 15, 2018.

BACKGROUND

Steady suction is theoretically and empirically known to be one of the most efficient flow control methods, for more than a century now. Recent theoretical development proves it is indeed the most efficient. For two decades it is known that adding unsteady component to steady blowing for flow control increases the efficiency of the air flow control system and makes zero-mass-flux excitation very effective.

There is a growing need to provide an efficient device and method for creating a distribution of unsteady suction, shown to be more efficient even when compared to steady suction.

SUMMARY

There may be provided a method for creating a distribution of unsteady suction, the method may include switching a first flow of fluid, in a cyclic manner and by a fluidic oscillator, between ejectors that may be fluidly coupled to the fluidic oscillator; and forming the distribution of unsteady suction at an aerodynamic surface that may be fluidly coupled to the ejectors, by creating, by each one of the ejectors, (a) pulsed suction through at least one first aperture, and (b) pulsed ejection through at least one second aperture.

The method may include creating by the ejectors (a) pulsed suction through first apertures, and (b) pulsed ejection through second apertures.

The creating of the pulsed suction by each one of the ejectors may include allowing additional fluid to join the first flow of fluid.

The ejectors may be two ejectors.

The method may include creating by the ejectors (a) pulsed suction through a pair of first apertures, and (b) pulsed ejection through a pair of second apertures.

The steps of switching and forming may be executed without moving any part of the fluidic oscillator and without moving any part of the ejectors.

The fluidic oscillator may include feedback elements that may be located at a single plane.

The fluidic oscillator may include feedback elements that may be formed from multiple portions that may be located at different planes.

The at least one first aperture and the at least one second aperture may be formed in the aerodynamic surface.

The at least one first aperture and the at least one second aperture may be parallel to each other.

The at least one first aperture and the at least one second aperture may be non-parallel to each other.

There may be provided a device for creating a distribution of unsteady suction, the device may include ejectors and a fluidic oscillator. The fluidic oscillator may be configured to switch a first flow of fluid, in a cyclic manner, between the ejectors. The ejectors may be fluidly coupled to the fluidic oscillator. Each one of the ejectors may be configured to create (a) a pulsed suction through at least one first aperture, and (b) a pulsed ejection through at least one second aperture.

The device may include an aerodynamic surface that may be fluidly coupled to the ejectors.

The ejectors may be configured to create (a) a pulsed suction through first apertures, and (b) a pulsed ejection through second apertures.

The each one of the ejectors may be configured to create the pulsed suction by allowing additional fluid to join the first flow of fluid.

The ejectors may be two ejectors.

The fluidic oscillator and the ejectors may be without moving parts.

The fluidic oscillator may include feedback elements that may be located at a single plane.

The fluidic oscillator may include feedback elements that may be formed from multiple portions that may be located at different planes.

The at least one first aperture and the at least one second aperture may be formed in the aerodynamic surface.

The at least one first aperture and the at least one second aperture may be parallel to each other.

The at least one first aperture and the at least one second aperture may be non-parallel to each other.

There may be provided a device for creating a distribution of unsteady suction, the device may consist essentially of ejectors and a fluidic oscillator; wherein the fluidic oscillator may be configured to switch a first flow of fluid, in a cyclic manner, between the ejectors; wherein the ejectors may be are fluidly coupled to the fluidic oscillator. Each one of the ejectors may be configured to create (a) a pulsed suction through at least one first aperture, and (b) a pulsed ejection through at least one second aperture.

There may be provided a method for creating a distribution of unsteady suction, the method may include: switching a first flow of fluid, multiple times and by a fluidic switch, between ejectors that may be fluidly coupled to the fluidic oscillator; and forming the distribution of unsteady suction at an aerodynamic surface that may be fluidly coupled to the ejectors, by creating, by each one of the ejectors, (a) a pulsed suction through at least one first aperture, and (b) a pulsed ejection through at least one second aperture.

The switching may be performed in a non-oscillatory manner.

The switching may be performed in a pseudo-random manner.

The method may include creating by the ejectors (a) a pulsed suction through first apertures, and (b) a pulsed ejection through second apertures.

The creating of the pulsed suction by each one of the ejectors may include allowing additional fluid to join the first flow of fluid.

The ejectors may be two ejectors.

The method may include creating by the ejectors (a) a pulsed suction through a pair of first apertures, and (b) a pulsed ejection through a pair of second apertures.

The steps of switching and forming may be executed without moving any part of the fluidic switch and without moving any part of the ejectors.

The fluidic switch may include feedback elements that may be located at a single plane.

The fluidic switch may include feedback elements that may be formed from multiple portions that may be located at different planes.

The at least one first aperture and the at least one second aperture may be formed in the aerodynamic surface.

The at least one first aperture and the at least one second aperture may be parallel to each other.

The at least one first aperture and the at least one second aperture may be non-parallel to each other.

There may be provided a device for creating a distribution of unsteady suction, the device may include: ejectors and a fluidic switch; wherein the fluidic switch may be configured to switch a first flow of fluid multiple times, between the ejectors; wherein the ejectors may be are fluidly coupled to the fluidic oscillator; and wherein each one of the ejectors may be configured to create (a) a pulsed suction through at least one first aperture, and (b) a pulsed ejection through at least one second aperture.

The device may include an aerodynamic surface that may be fluidly coupled to the ejectors.

The ejectors may be configured to create (a) a pulsed suction through first apertures, and (b) a pulsed ejection through second apertures.

The each one of the ejectors may be configured to create the pulsed suction by allowing additional fluid to join the first flow of fluid.

The ejectors may be two ejectors.

The fluidic switch and the ejectors may be without moving parts.

The fluidic switch may include feedback elements that may be located at a single plane.

The fluidic switch may include feedback elements that may be formed from multiple portions that may be located at different planes.

The at least one first aperture and the at least one second aperture may be formed in the aerodynamic surface.

The at least one first aperture and the at least one second aperture may be parallel to each other.

The at least one first aperture and the at least one second aperture may be non-parallel to each other.

There may be provided a device for creating a distribution of unsteady suction, the device may consist essentially of ejectors and a fluidic switch; wherein the fluidic switch may be configured to switch a first flow of fluid, multiple times, between the ejectors; wherein the ejectors may be are fluidly coupled to the fluidic switch; and wherein each one of the ejectors may be configured to create (a) a pulsed suction through at least one first aperture, and (b) a pulsed ejection through at least one second aperture.

BRIEF DESCRIPTION OF THE DRAWINGS

The embodiments of the disclosure will be understood and appreciated more fully from the following detailed description, taken in conjunction with the drawings in which.

DETAILED DESCRIPTION OF THE DRAWINGS

Figure 1:
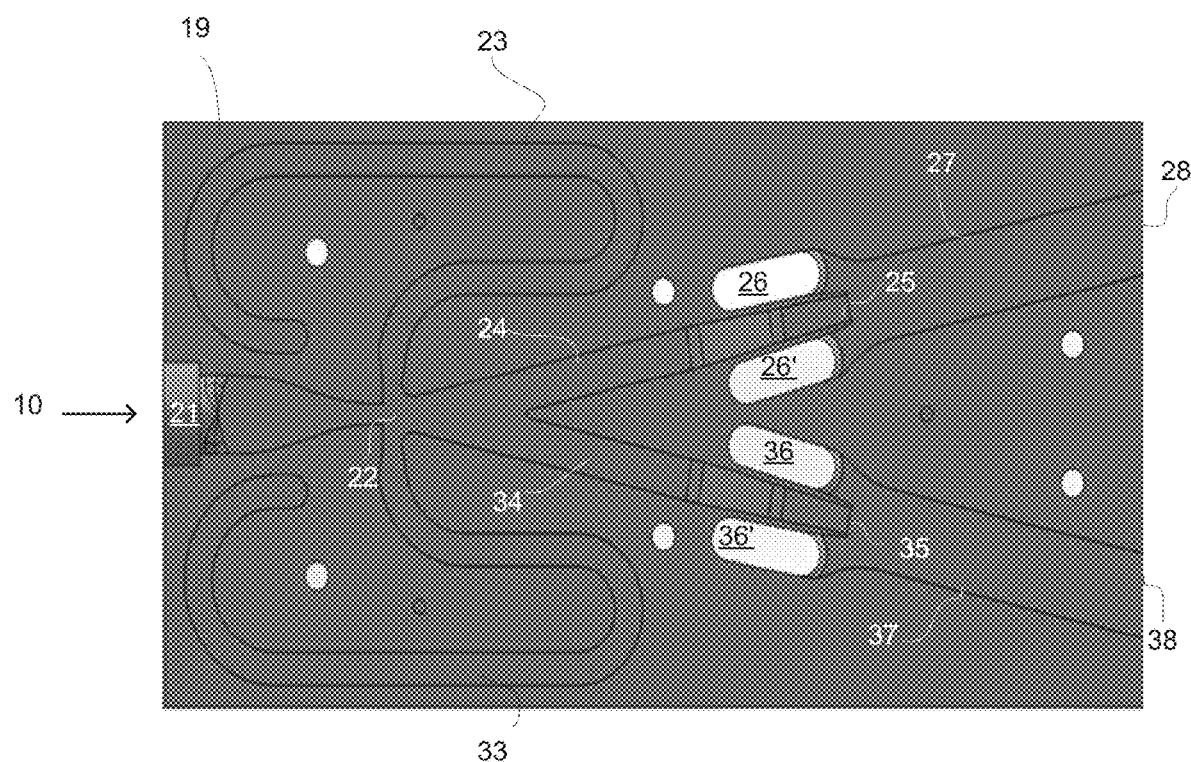
FIG. 1 is an example of at least a part of a device.

Any reference to a device should be applied, mutatis mutandis to a method that is executed by a device.

Any reference to method should be applied, mutatis mutandis to a device that is configured to execute the method.

The term "and/or" is additionally or alternatively.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the device.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

The term "fluid" may include any kind of Newtonian or non-Newtonian fluid. The fluid may be, for example, air (gas) or water (liquid) or even two and three phase flow of gas, liquid and solid particles included.

The term "fluidic" means related to fluid. For example—a fluidic switch is a component that switches fluid—for example from flowing towards one ejector to flowing towards another ejector. Yet for another example—a fluidic oscillator is a device that repeatedly (for example at a fixed cycle) changes a direction of a flow of fluid.

There may be provided a method and a device capable of the creation of unsteady flow perturbations. The device is configured to create oscillatory suction by the use of ejectors. The ejectors are placed downstream of a fluidic oscillator such as but not limited to a bi-stable fluidic oscillator that is configured to switch the flow in a cyclic manner between the ejectors. Downstream means that fluid from the fluidic oscillator propagates towards the ejectors.

In turn, the ejectors can be fluidly coupled to an aerodynamic surface (so that ejected flows from the ejectors may reach the aerodynamic surface) and by creating pulsed suction and pulsed blowing (also referred to as pulsed ejection)—they create a distribution of unsteady suction over the aerodynamic surface in addition to the pulsed blowing.

The pulsed suction is made through first apertures of the device.

This method and device are highly efficient.

The pulsed blowing (pulsed ejection) can be ejected in a variety of locations and orientations with respect to an aerodynamic surface, to further control the flow, e.g., a separating boundary layer. The locations and orientations are defined by locations of second apertures of the device. It should be noted that as well as the pulsed blowing, the pulsed suction can also be implemented in a variety of locations and orientation The device may be configured to oscillate at a single frequency, determined by (a) a length of feedback elements of the fluidic oscillator, (b) one or more additional geometry parameters (such as the distance between the fluidic oscillator and the ejectors) and by a flow velocity of the first flow received by the device.

The feedback elements may be located at one plane or may be located at multiple interconnecting planes. In the latter case, the feedback element may include multiple portions that are located at different planes that may be of different heights.

The device may be static in the sense that the creation of the pulsed suction and the creation of the pulsed ejection is performed without moving any part of the device. This makes the device robust, easy to manufacture and easy to maintain.

The device is also compact and simple. The largest dimension of the device may be, for example, in a range—for example up to 50 millimeters. Other sizes may be provided that can be 10 times smaller or larger. The device may have only a single fluidic oscillator—or may have multiple fluidic oscillators. The device may operate at a large range of first flow pressure levels—including low pressure levels that may be lower than 2 bars—for example even reach 0.0001 bar gauge.

For simplicity of explanation it is assumed that the number of ejectors is two. It should be noted that the number of ejectors may exceed two or the device may have a single ejector.

Different ejectors may be fluidly coupled to different apertures.

The first apertures may differ from each other by shape and/or size and may differ from the second apertures by shape and/or size.

In various figures the device is illustrated as including two ejectors. Each ejector is fluidly coupled to a single first aperture and to a pair of second apertures.

There may be any relationship between the number of ejectors, the number of first apertures, and the number of the second apertures—as long as each ejector is fluidly coupled to one or more first aperture and to one or more second apertures.

The fluidic oscillator may include feedback elements that are located at a single plane. Alternatively—the fluidic oscillator may include feedback elements that are formed from multiple portions that are located at different planes.

The at least one first aperture and the at least one second aperture may be formed in the aerodynamic surface—or may be fluidly coupled to the aerodynamic surface.

The device may include an aerodynamic surface that is fluidly coupled to the ejectors. Alternatively, the device does not include the aerodynamic surface but is fluidly coupled to the aerodynamic surface.

The aerodynamic surface may be of any size and shape.

The at least one first aperture and the at least one second aperture may be parallel to each other or may be non-parallel to each other.

FIG. 1 is an example of a middle layer of a device 20 for creating a distribution of unsteady suction. Device 20 includes (a) an input port 21 for receiving a first flow of fluid 10, (b) a fluidic oscillator 22 that is downstream to the input port, (c) two ejectors 25 and 35 that are downstream to the fluidic oscillator 22, (d) first apertures 28 and 38, (e) second apertures 26, 26', 36 and 36', and (f) body 19. Input port 21 may be positioned at any orientation and/or at any surface or side of device 20. It should be noted that ports 26 and 36 may of any form.

Fluidic oscillator 22 includes feedback elements such as feedback tubes 23 and 33. A non-limiting example of a fluidic oscillator is illustrated in U.S. Pat. No. 7,055,541 which is incorporated herein by reference. It should be noted that feedback tubes 23 and 33 may be connected in the plane of the middle layer or out of the plane. The length, diameter of each feedback tube and the resistance at connections of the feedback tube along the main flow volume controls a oscillation frequency of the fluidic oscillator. Port 21 may be in the plane of may enter out of the plane.

First ejector 25 is fluidly coupled (via conduit 24) to fluidic oscillator 22, to first aperture 28, and to second apertures 26 and 26'.

Second ejector 35 is fluidly coupled (via conduit 34) to fluidic oscillator 22, to first aperture 38, and to second apertures 36 and 36'.

Fluidic oscillator 22 is configured to switch a first flow of fluid (from input port 21, in a cyclic manner, between ejector 25 and ejector 35.

Each one of first ejector 25 and second ejector 35 is configured to (a) create pulsed ejection through at least one first aperture (28 and 38 respectively), and (b) create pulsed suction through at least one second aperture (pair of second apertures 26 and 26' as well as pair of second apertures 36 and 26'). The first apertures may be referred to as ejection apertures while the second apertures may be regarded as suction apertures.

Overall, the first and second ejectors 25 and 35 are configured to create (a) pulsed ejection through first apertures 28 and 38, and (b) pulsed suction through second apertures 26, 26', 36 and 36'.

Each one of the ejectors (25 and 35) is configured to create the pulsed suction by allowing additional fluid to join the first flow of fluid. The additional fluid may be sucked through the second apertures.

Figure 2:
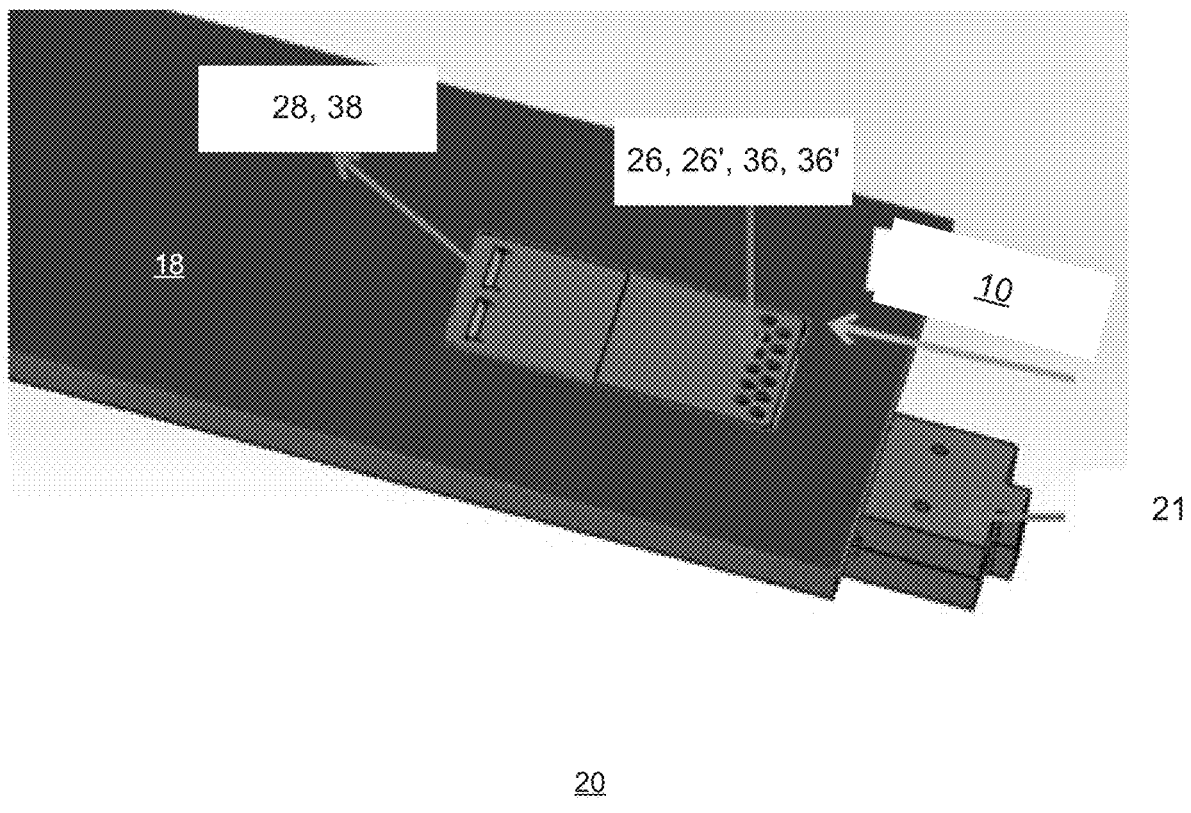
FIG. 2 is an example of at least a part of a device.

FIG. 2 illustrates an aerodynamic surface 18 and a device 20 that is surrounded by the aerodynamic surface 18. It should be noted that any other spatial relationship may exist between the device and the aerodynamic surface. For example—one side of device may interface with the aerodynamic surface.

Figure 3:
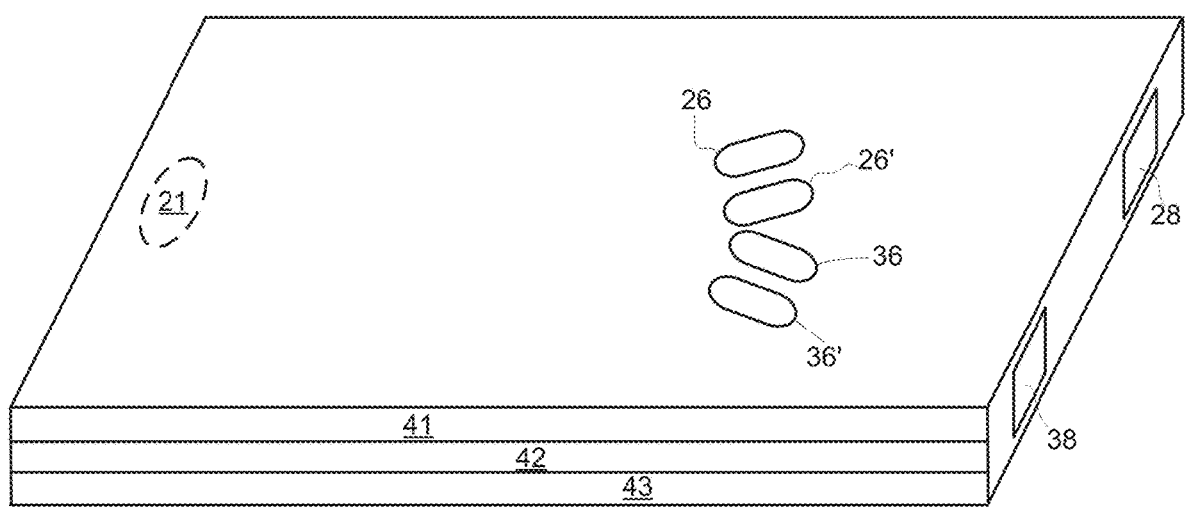
FIG. 3 is an example of at least a part of a device.

FIG. 3 illustrates device 20 as including three layers—an upper layer 41, a middle layer 42 and a bottom layer 43.

The second apertures 26, 26', 36 and 36' are formed in the upper layer 41.

The first apertures 28 and 38 extend outside the three layers and may be oriented at any desired direction.

The input port 21 is formed on another side of the three layers.

Various components such as the fluidic oscillator and the two ejectors are formed below the top layer 41 and are not shown in FIG. 3.

Figure 4:
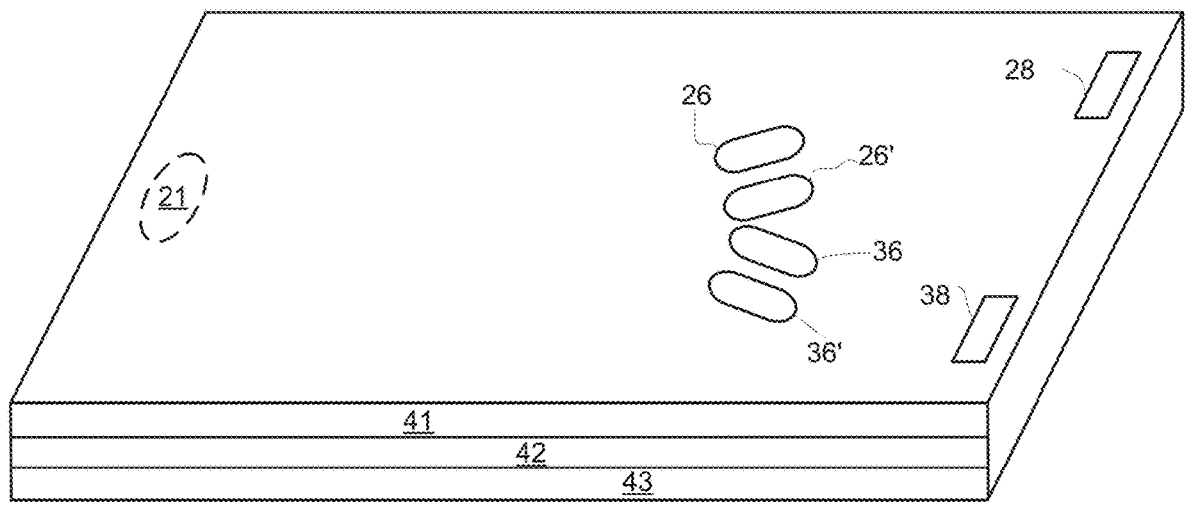
FIG. 4 is an example of at least a part of a device.

FIG. 4 illustrates device 20 as including three layers—an upper layer 41, a middle layer 42 and a bottom layer 43.

The second apertures 26, 26', 36 and 36' as well as the first apertures 28 and 38 are formed in the upper layer 41.

Figure 5:
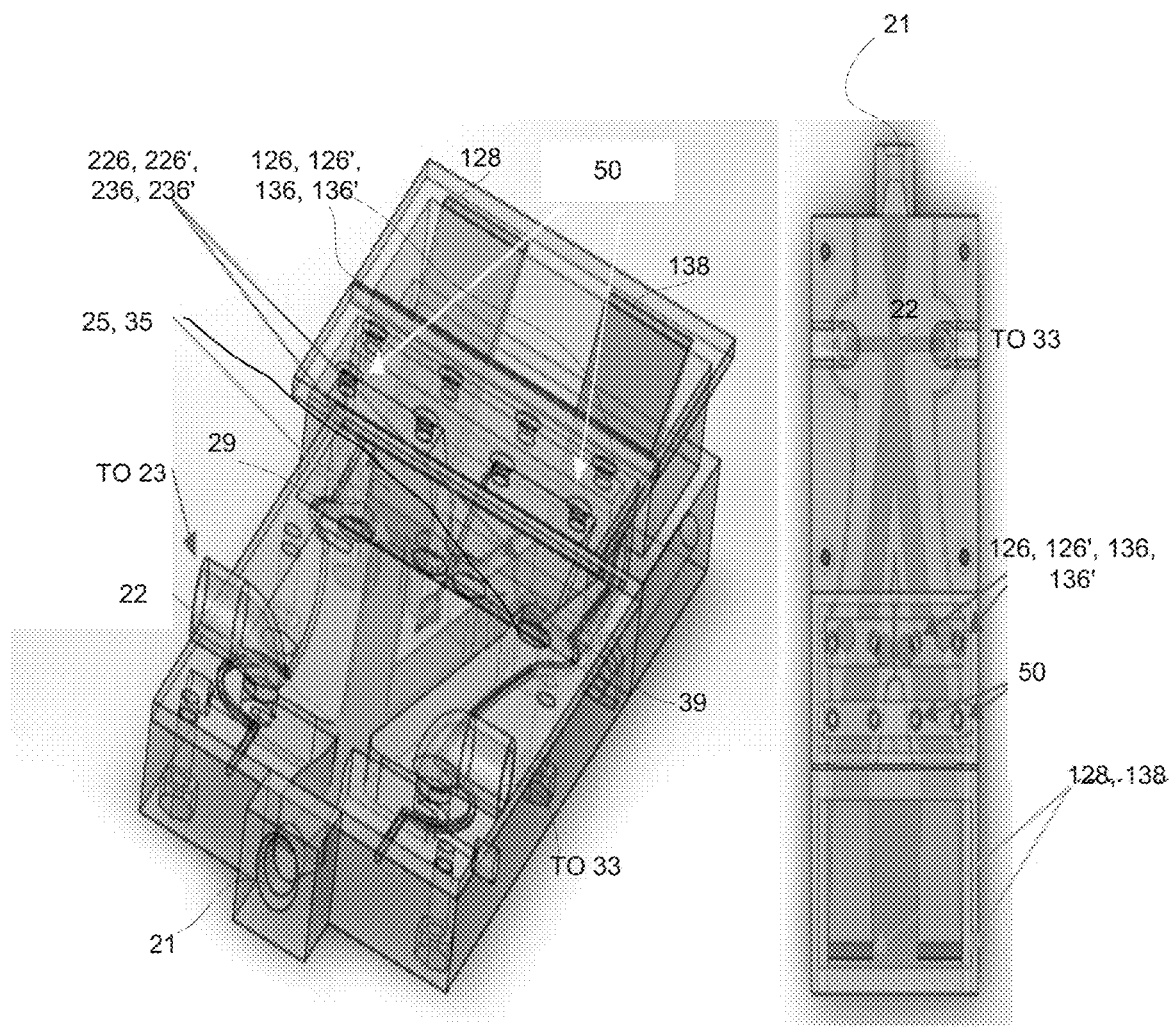
FIG. 5 is an example of at least a part of a device.

FIG. 5 illustrates a device 120 that includes (a) input port 21, (b) fluidic oscillator 22, (c) ejectors 25 and 35, (d) first apertures 128 and 138, (e) second apertures 126, 126', 136 and 136', (f) third apertures 50 and (g) lower openings 226, 226', 236 and 236'. For simplicity of explanation the feedback elements (such as feedback tubes 23 and 33) are not shown.

Lower openings 226, 226', 236 and 236 are fluidly coupled to the second apertures 126, 126', 136 and 136 and are located at the same plane as (or otherwise in proximity to) the ejectors.

The third apertures 50 are used to provide a constant suction. These third apertures are optional. Alternatively—the third apertures 50 may be fluidly coupled to any ejection aperture and/or to any suction aperture. The constant suction may be located downstream/upstream the pulsed suction.

Figure 6:
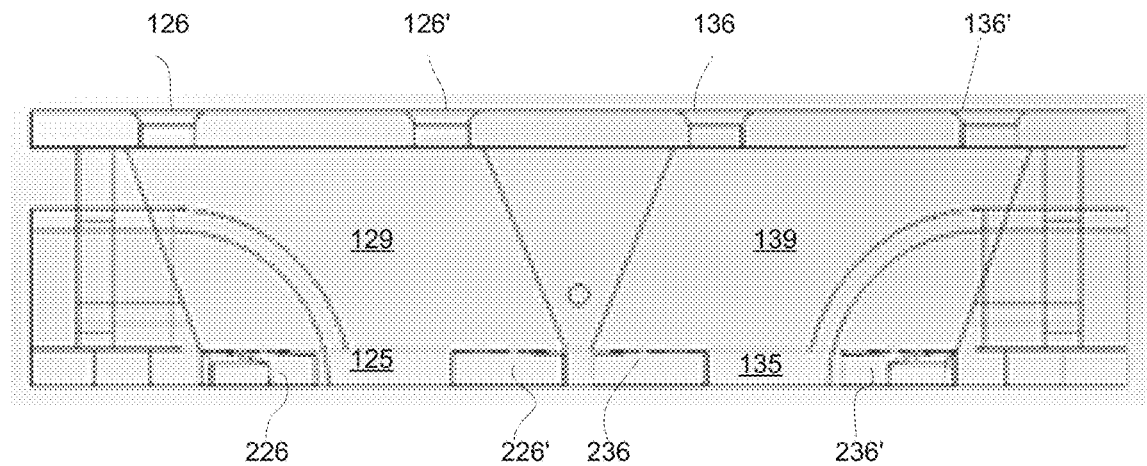
FIG. 6 is an example of at least a part of a device.
Figure 6:
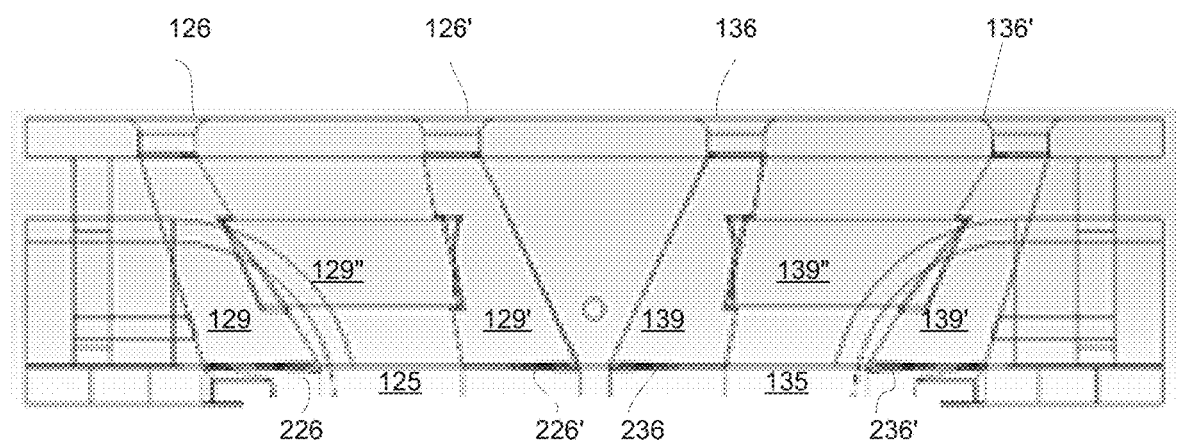
Figure 6:
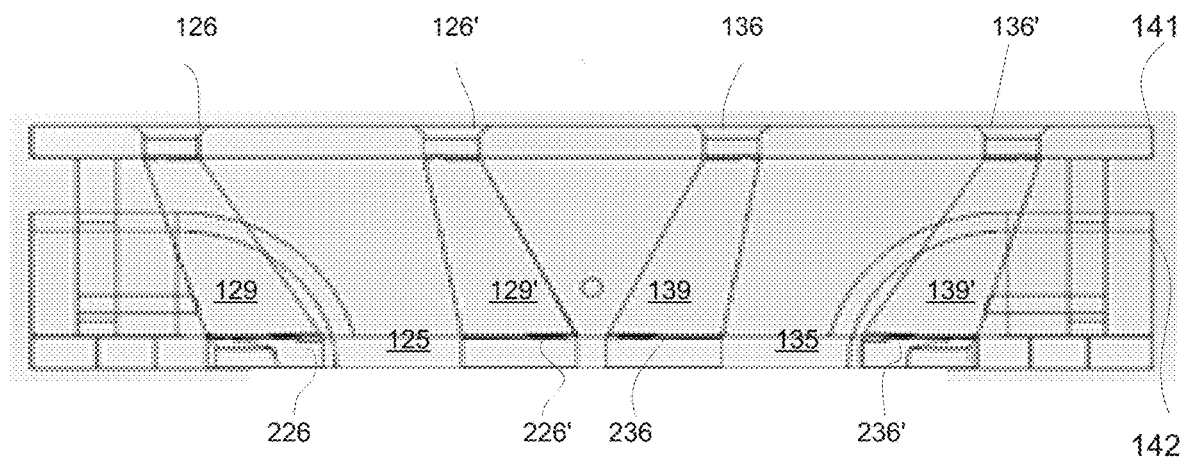

FIG. 6 illustrates different manners to fluidly couple lower openings 226, 226', 236 and 236 to second apertures 126, 126', 136 and 136.

The top part of FIG. 6 illustrates a single cavity per ejector. First cavity 129 fluidly couples second apertures 126 and 126' to lower openings 226 and 226'. Second cavity 139 fluidly couples second apertures 136 and 136' to lower openings 236 and 236'.

The bottom part of FIG. 6 illustrates a pair of cavities per ejector.

First cavity 129 fluidly couples second aperture 126 to lower opening 226. Second cavity 139 fluidly couples second aperture 136 to lower opening 236. Third cavity 129' fluidly couples second aperture 126' to lower opening 226'. Fourth cavity 139' fluidly couples second aperture 136' to lower opening 236'.

The middle part of FIG. 6 illustrates a pair of cavities per ejector and a linking conduit that links each pair of cavities. First cavity 129 fluidly couples second aperture 126 to lower opening 226. Second cavity 139 fluidly couples second aperture 136 to lower opening 236. Third cavity 129' fluidly couples second aperture 126' to lower opening 226'. Fourth cavity 139' fluidly couples second aperture 136' to lower opening 236'.

First linking conduit 129" that fluidly couples first cavity 129 to third cavity 129'. Second linking conduit 139" that fluidly couples second cavity 139 to fourth cavity 139'.

FIG. 6 also shows top layer 141 and middle layer 142.

Figure 7:
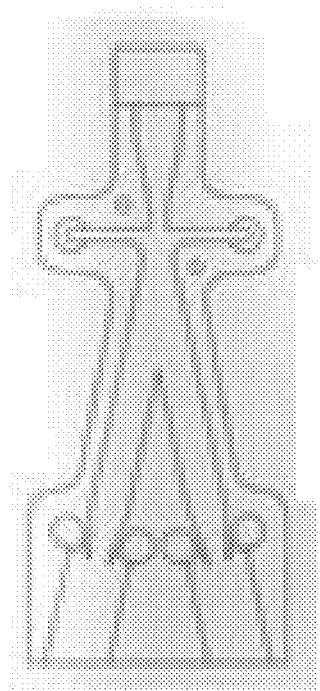
FIG. 7 is an example of at least a part of a device.
Figure 7:
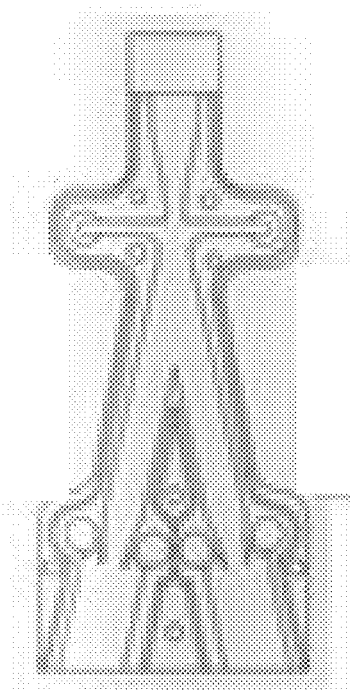
Figure 7:
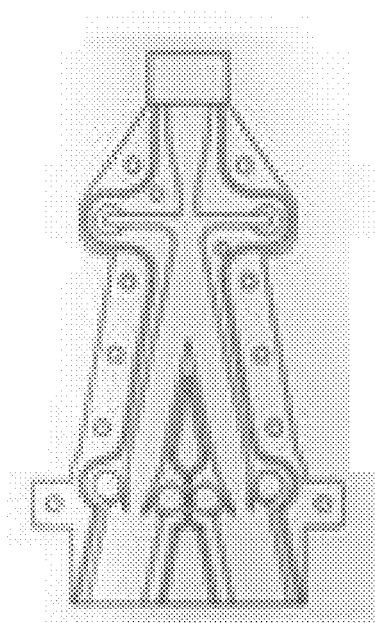
Figure 7:
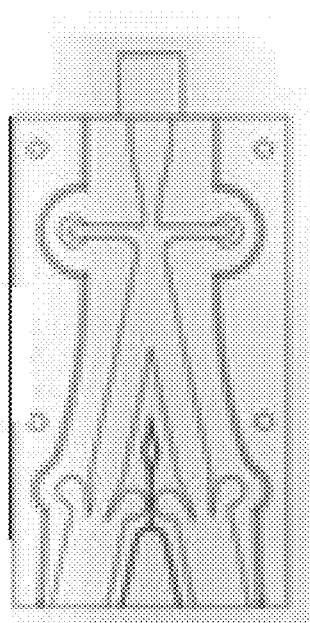

FIG. 7 illustrates different middle layers of different devices 140, 142, 144 and 146 that differ from each other by the shape and/or size of at least one component.

Figure 8:
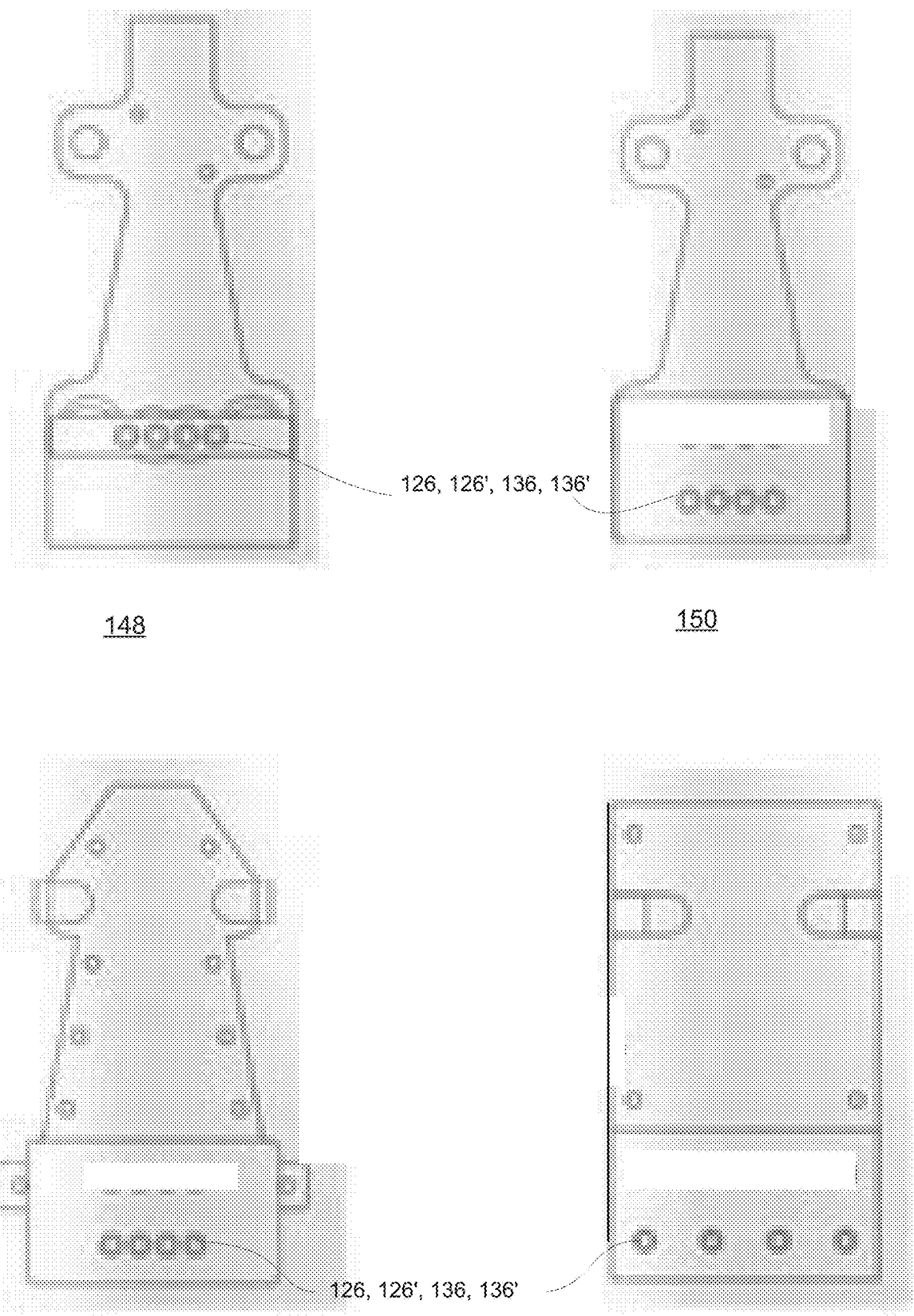
FIG. 8 is an example of at least a part of a device.

FIG. 8 illustrates different top layers of different devices 148, 150, 152 and 154 that differ from each other by the shape and/or size of at least one component. These top layers include various apertures such as first apertures and/or second apertures.

Figure 9:
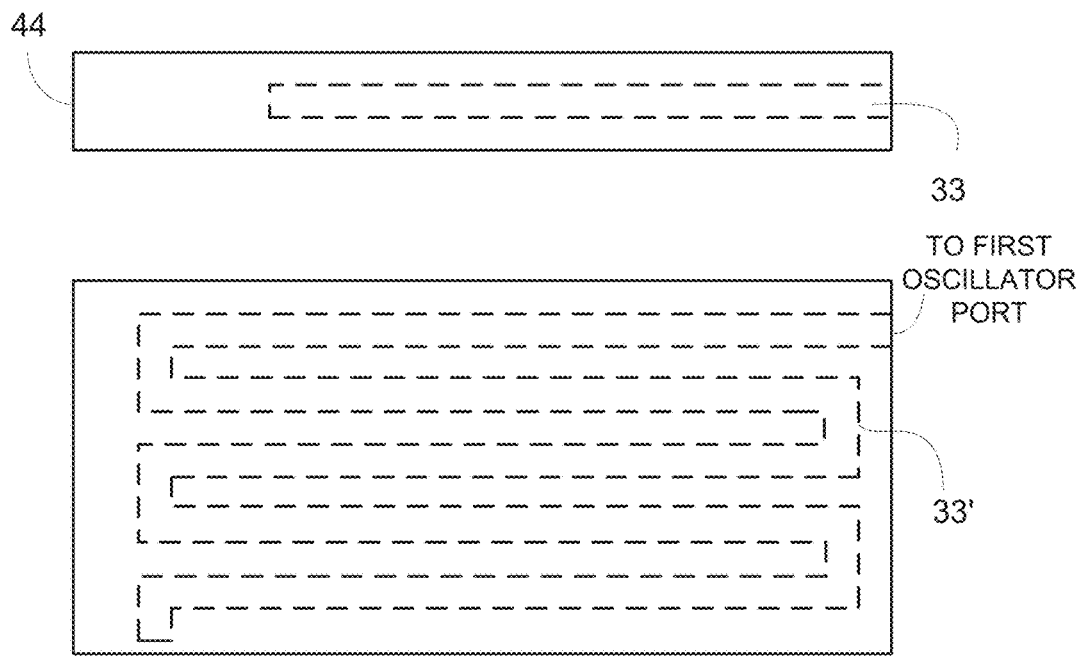
FIG. 9 is an example of at least a part of a device.

The top part of FIG. 9 illustrates a cross section of a "flat" feedback element 33 located within a single plane of a device.

The lower part of FIG. 9 illustrates a cross section of a feedback element 33' that is located at multiple planes—to include multiple portions that are located at different heights/different levels. One end of the feedback element may be fluidly coupled to an oscillator port of the fluidic oscillator while the other end is closed. The feedback element may have other shapes.

Figure 10:
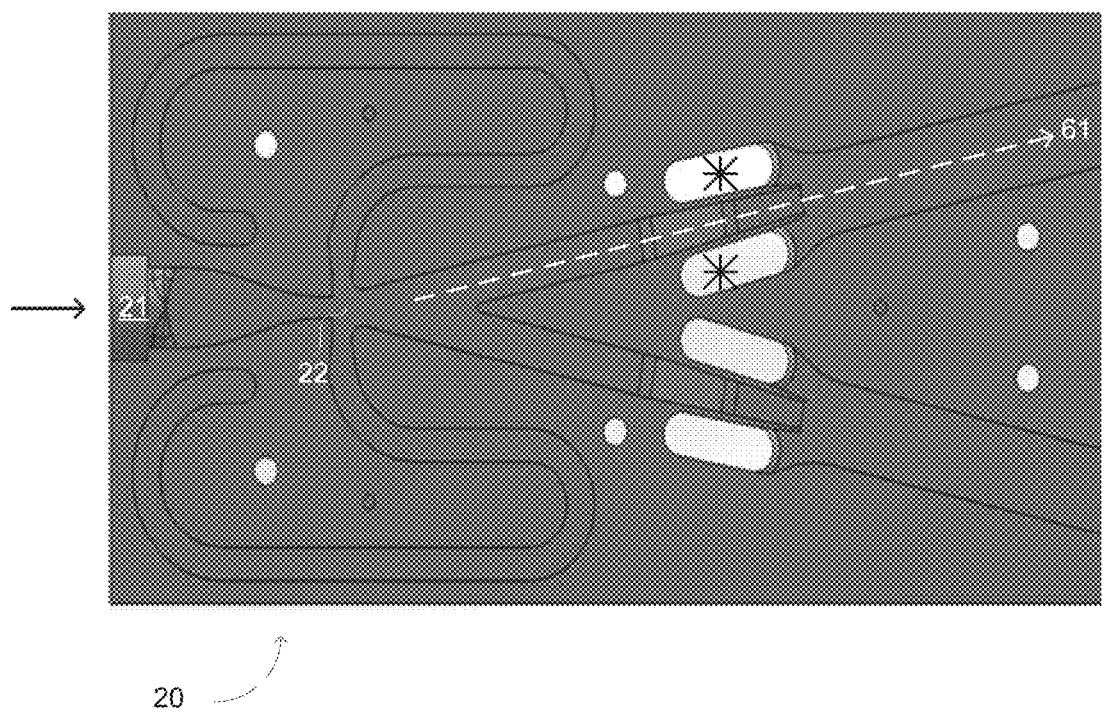
FIG. 10 is an example of at least a part of a device.
Figure 10:
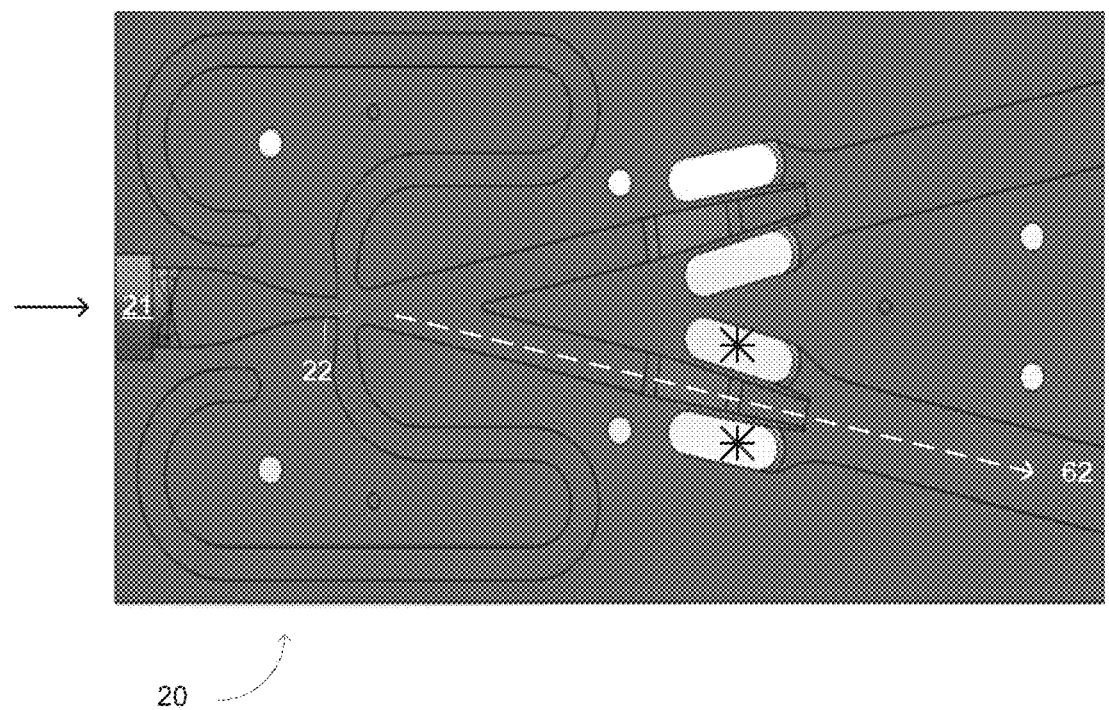

FIG. 10 illustrates the direction of a flow of fluid 61 and 62 at different times—to illustrate the switching of the flow of fluid between the ejectors.

Figure 11:
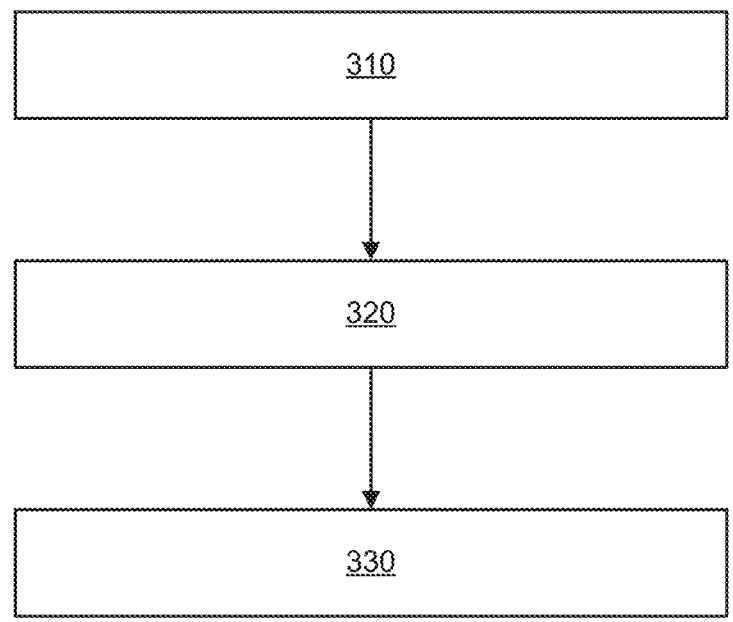
FIG. 11 is an example of a method.

FIG. 11 illustrates an example of method 300.

Method 300 is for creating a distribution of unsteady suction.

Method 300 may start by step 310 of receiving by a device a first flow of fluid.

Step 310 may be followed by step 320 of switching the first flow of fluid, in a cyclic manner and by a fluidic oscillator, between ejectors that are fluidly coupled to the fluidic oscillator.

Step 320 may be followed by step 330 of forming the distribution of unsteady suction at an aerodynamic surface that is fluidly coupled to the ejectors, by creating, by each one of the ejectors, (a) pulsed suction through at least one first aperture, and (b) pulsed ejection through at least one second aperture.

Accordingly—step 330 includes creating by the ejectors (a) pulsed suction through first apertures, and (b) pulsed ejection through second apertures.

Step 330 may include creating of the pulsed suction by each one of the ejectors by allowing additional fluid to join the first flow of fluid—thereby generating an amplified flow.

Steps 310, 320 and 330 may be executed without moving any part of the fluidic oscillator and without moving any part of the ejectors.

The method is highly efficient from an energetic view point as one unit of input flow is translated by the device to pulsating suction and pulsating elections at multiple apertures at different points in time and/or space without any moving parts or requirement for external energy addition to create the oscillations.

It should be noted that the switching of the flow of fluid between the ejectors can be done in an oscillatory manner—but it should be noted that the switching may be done in any other manner—including random, pseudo random, or any non-cyclic manner. The fluidic oscillator may be replaced by a fluidic switch that may apply one or more switching schemes that may be oscillatory or non-oscillatory.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any device that is illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

We claim:

1. A method for creating a distribution of unsteady suction, the method comprises: switching a first flow of fluid, in a cyclic manner and by a fluidic oscillator, between ejectors that are fluidly coupled to the fluidic oscillator being downstream of said fluidic oscillator; and forming the distribution of unsteady suction at an aerodynamic surface that is fluidly coupled to the ejectors, by creating, by each one of the ejectors, (a) pulsed suction through at least one first aperture downstream of said fluidic oscillator, and (b) pulsed blowing through at least one second aperture.

2. The method according to claim 1 comprising creating by the ejectors (a) pulsed suction through first apertures, and (b) pulsed blowing through second apertures.

3. The method according to claim 1 wherein the creating of the pulsed suction by each one of the ejectors comprises allowing additional fluid to join the first flow of fluid.

4. The method according to claim 1 wherein the ejectors are two ejectors.

5. The method according to claim 4 comprising creating by the ejectors (a) pulsed suction through a pair of first apertures, and (b) pulsed blowing through a pair of second apertures.

6. The method according to claim 1 wherein the steps of switching and forming are executed without moving any part of the fluidic oscillator and without moving any part of the ejectors.

7. The method according to claim 1 wherein the fluidic oscillator comprises feedback elements that are located at a single plane.

8. The method according to claim 1 wherein the fluidic oscillator comprises feedback elements that are formed from multiple portions that are located at different planes.

9. The method according to claim 1 wherein the at least one first aperture and the at least one second aperture are formed in the aerodynamic surface.

10. The method according to claim 1 wherein the at least one first aperture and the at least one second aperture are parallel to each other.

11. The method according to claim 1 wherein the at least one first aperture and the at least one second aperture are non-parallel to each other.

12. A device for creating a distribution of unsteady suction, the device comprises: a fluidic oscillator and ejectors located downstream of the fluidic oscillator; wherein the fluidic oscillator is configured to switch a first flow of fluid, in a cyclic manner, between the ejectors;
wherein the ejectors are fluidly coupled to the fluidic oscillator; and wherein each one of the ejectors is configured to create (a) pulsed suction through at least one first aperture downstream of said fluidic oscillator, and (b) pulsed blowing through at least one second aperture.

13. The device according to claim 12 comprising an aerodynamic surface that is fluidly coupled to the ejectors.

14. The device according to claim 12 wherein the ejectors are configured to create (a) pulsed suction through first apertures, and (b) pulsed blowing through second apertures.

15. The device according to claim 12 wherein each one of the ejectors is configured to create the pulsed suction by allowing additional fluid to join the first flow of fluid.

16. The device according to claim 12 wherein the ejectors are two ejectors.

17. The device according to claim 12 wherein the fluidic oscillator and the ejectors are without moving parts.

18. The device according to claim 12 wherein the fluidic oscillator comprises feedback elements that are located at a single plane.

19. The device according to claim 12 wherein the fluidic oscillator comprises feedback elements that are formed from multiple portions that are located at different planes.

20. The device according to claim 12 wherein the at least one first aperture and the at least one second aperture are formed in the aerodynamic surface.

* * * * *